Sept. 27, 1955     E. E. JENNINGS     2,719,054
TRAILER END GATE CONSTRUCTION
Filed Sept. 2, 1952     4 Sheets-Sheet 1
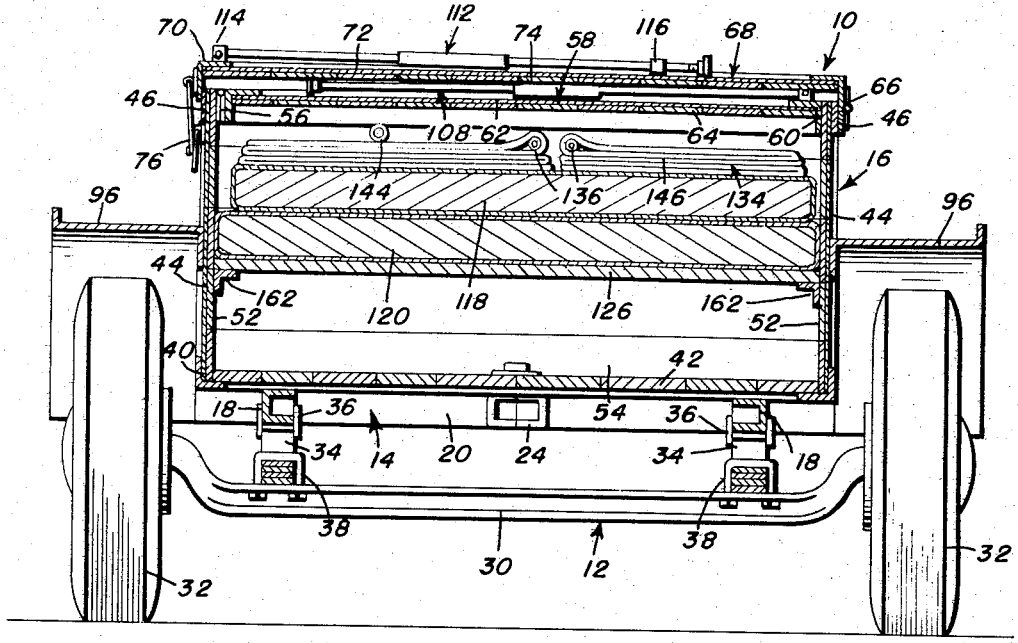
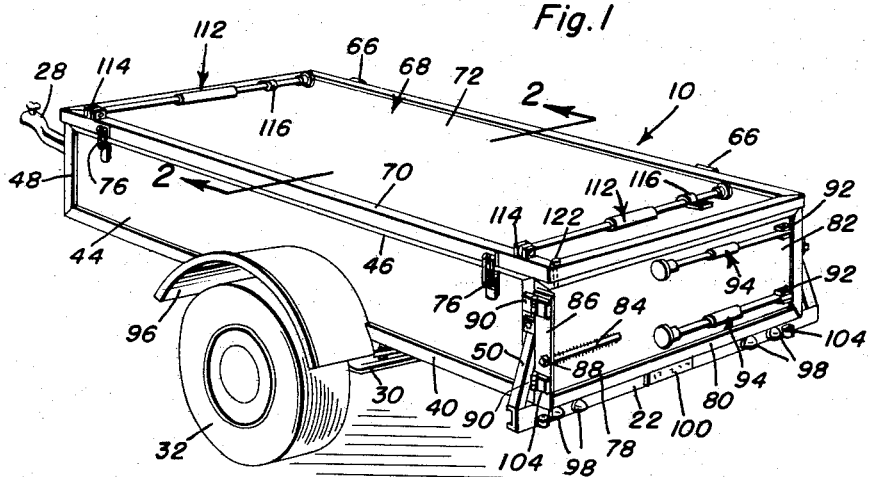
Ernest E. Jennings
INVENTOR.
BY
*Clarence A. O'Brien
and Harvey B. Jacobson*
Attorneys

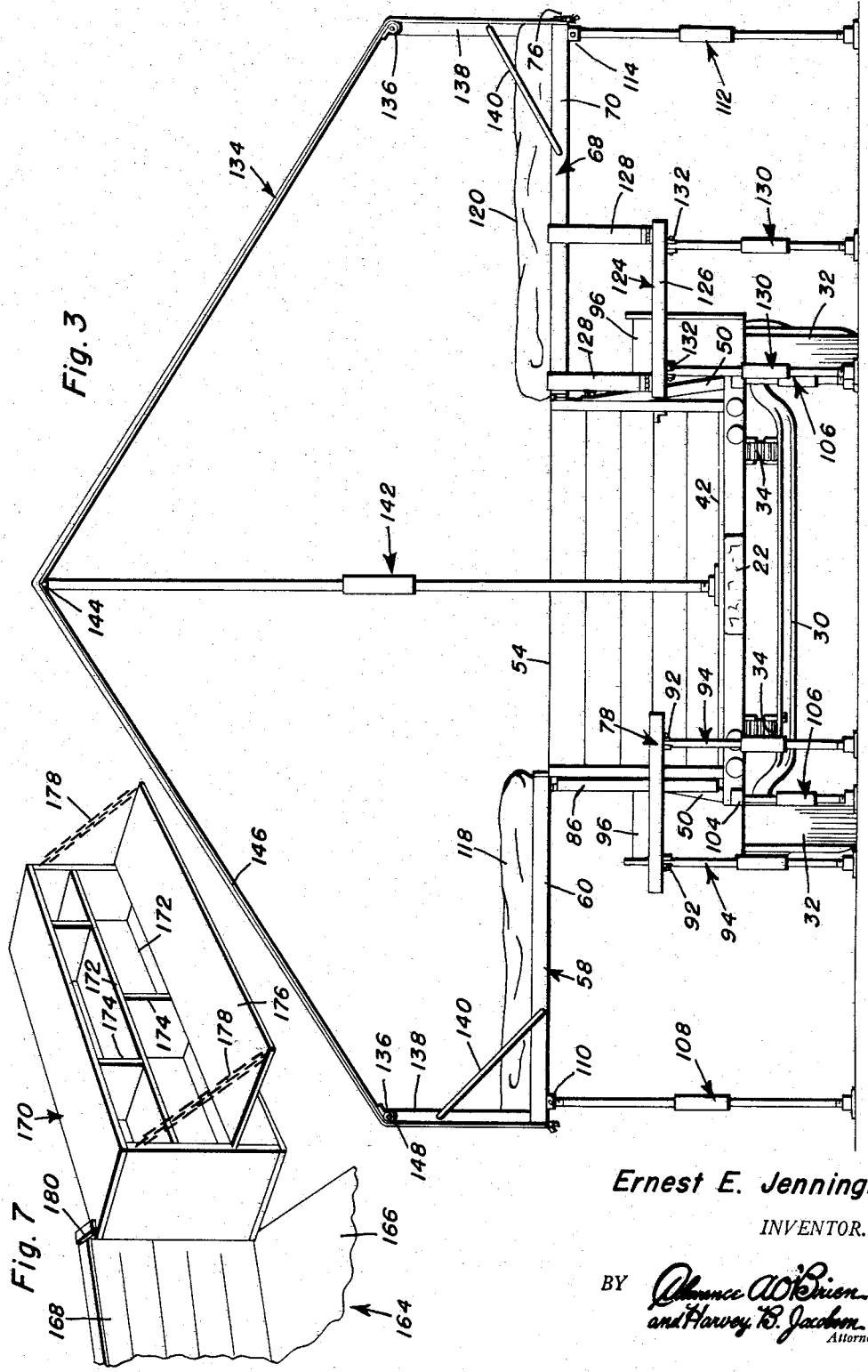

Sept. 27, 1955  E. E. JENNINGS  2,719,054
TRAILER END GATE CONSTRUCTION
Filed Sept. 2, 1952  4 Sheets-Sheet 3
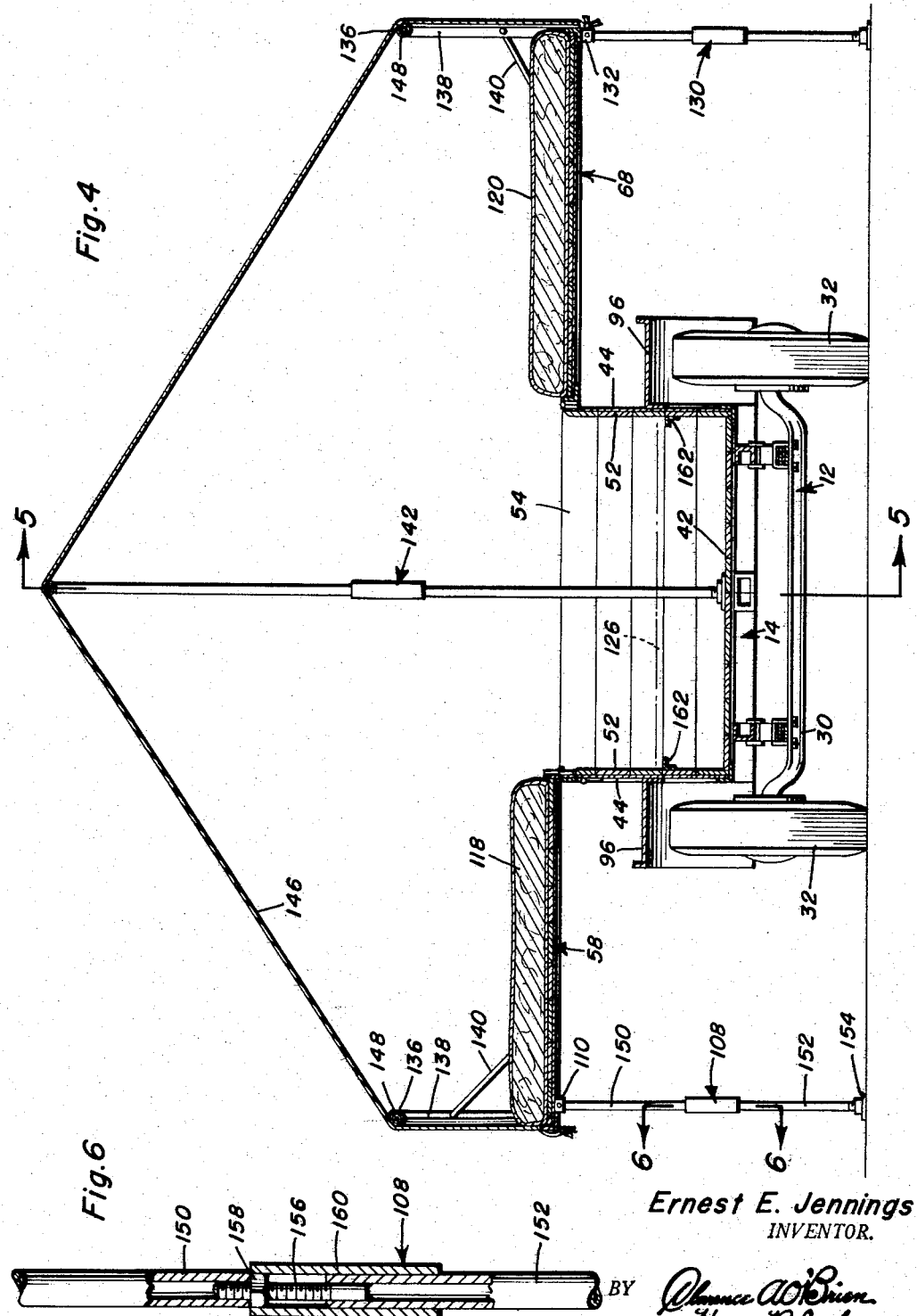
Ernest E. Jennings
INVENTOR.

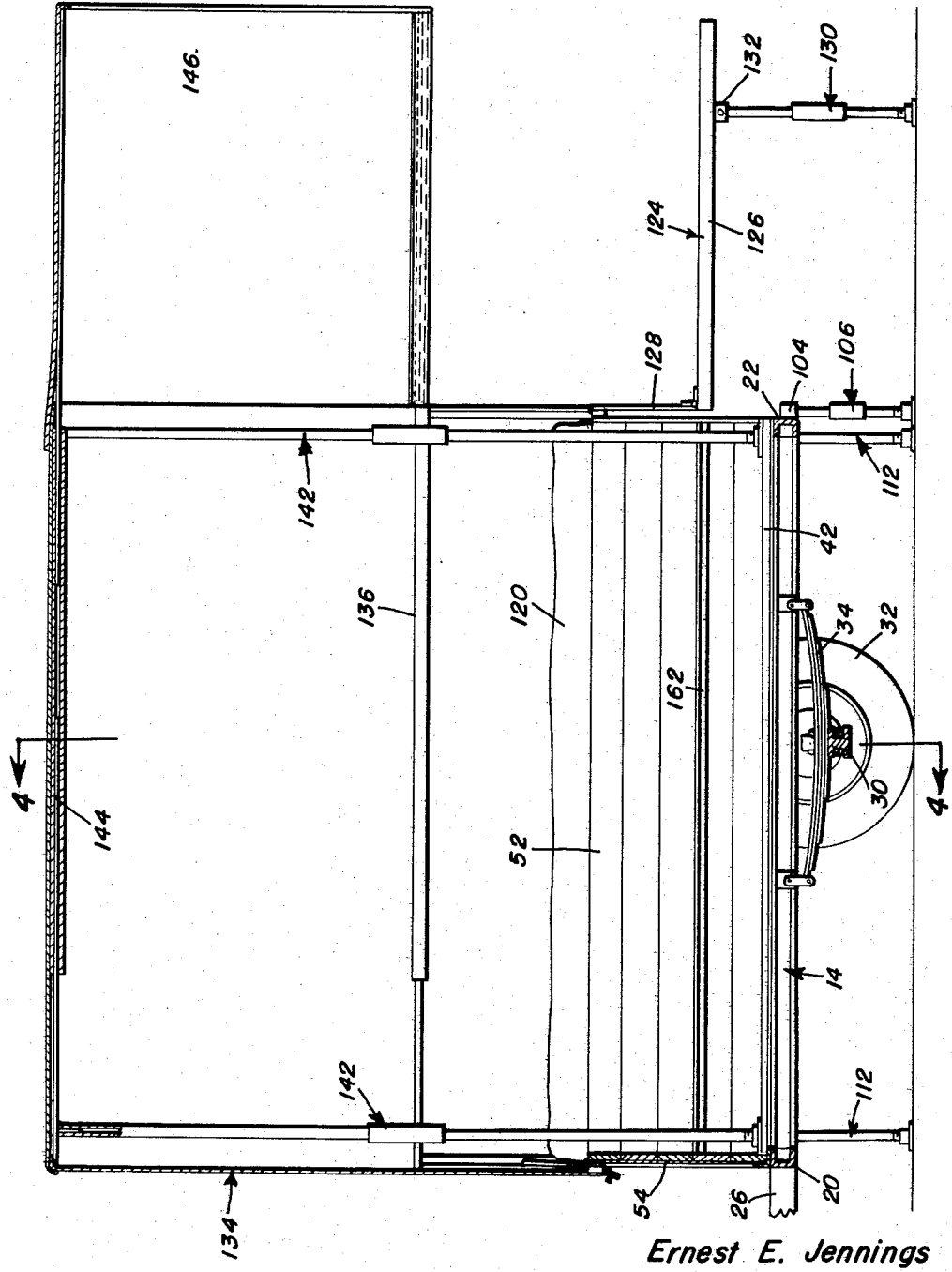

United States Patent Office 2,719,054
Patented Sept. 27, 1955

2,719,054

TRAILER END GATE CONSTRUCTION

Ernest E. Jennings, Brock, Nebr.

Application September 2, 1952, Serial No. 307,495

2 Claims. (Cl. 296—23)

This invention relates in general to vehicles, and more specifically to a trailer adapted to be drawn behind motor vehicles.

The primary object of this invention is to provide an improved trailer which is especially designed for camping trips and which is equipped with means for satisfactory living in the open.

Another object of this invention is to provide an improved trailer intended for camping, said trailer being foldable from a compact unit to a relatively large unit which may be selectively enclosed within a tent-like canopy.

Another object of this invention is to provide an improved trailer which includes a body having first and second top panels, said top panels being foldable outwardly into horizontal positions to form sleeping platforms.

A further object of this invention is to provide an improved camp trailer which includes a generally rectangular body having an end gate, said end gate being pivotally mounted whereby the same may be swung rearwardly and rotated to a horizontal plane to form a table-like structure.

A still further object of this invention is to provide an improved camp trailer in which the tail gate thereof is swingable outwardly with respect to the remainder of the trailer body, said end gate being of a relatively great depth and forming a supply cabinet.

Another object of this invention is to provide an improved camp trailer wherein a majority of the various portions thereof in its open position form portions of the body thereof in the closed position, the interior of the body being of a sufficient size to conveniently store those parts of the trailer not forming a portion of the body.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 1 is a rear perspective view of the camp trailer, which is the subject of this invention, and shows the general appearance of the same in its folded position ready to be towed along a road;

Figure 2 is an enlarged transverse vertical sectional view taken substantially upon the plane indicated by the section line 2—2 of Figure 1 and shows the general construction of the trailer and the arrangement of the elements thereof when the same is in its folded condition;

Figure 3 is an enlarged rear elevational view of the camp trailer of Figure 1 when the same is in its open state and shows the arrangement of the various elements thereof when in this state;

Figure 4 is a transverse vertical sectional view taken through substantially the center of the trailer along the section line 4—4 of Figure 5 and shows the general arrangement of the parts of the trailer and the construction of the same, the main support for the trailer body not being shown in section;

Figure 5 is a longitudinal vertical sectional view taken substantially upon the plane indicated by the section line 5—5 of Figure 4 and further shows the construction of the camp trailer;

Figure 6 is an enlarged fragmentary vertical sectional view taken substantially upon the plane indicated by the section line 6—6 of Figure 4 and shows the adjustable construction of one of the support legs of the trailer; and Figure 7 is a fragmentary rear perspective view of a modified form of the end gate and shows the same in an open position.

Similar characters of reference designate similar or identical elements and portions throughout the specification and throughout the different views of the drawings.

Referring now to the drawings in detail, it is seen that the camp trailer, which is the subject of this invention, is referred to in general by the reference numeral 10. The camp trailer 10 includes a running gear, which is referred to in general by the reference numeral 12, a supporting frame, which is referred to in general by the reference numeral 14, and a body, which is referred to in general by the reference numeral 16.

The frame 14 includes a pair of spaced longitudinally extending side rails 18 which are of a channel-shaped cross section and which are connected together at their forward ends by a front cross frame member 20. The side rails 18 are also connected together at their rear ends by a rear cross frame member 22, the rear cross frame member 22 being of a greater width than the front cross frame member 20. The frame 14 also includes a center frame rail 24 which is box-shaped and is formed of two channel members connected together. The frame rail 24 terminates at its rear end in an intersection with the rear cross frame member 22 and extends forwardly of the front cross frame member 20 to form a tongue 26 for towing the trailer 10. Secured to the forward end of the tongue 26 is a trailer hitch 28 for attaching the trailer 10 to a tow vehicle.

The running gear 12 includes a drop center axle 30 which has mounted for rotation on the outer ends thereof wheels 32. The axle 30 extends transversely of the frame 14 and is suspended therefrom by a pair of longitudinally extending springs 34. The springs 34 are in alignment with the side rails 18 and secured thereto by shackles 36. The springs 34 are also connected to the axle 30 by U-bolts 38.

The body 16 includes a U-shaped bottom frame 40 which is formed of a plurality of upwardly open angle irons and which extends along the side and front of the body. The U-shaped frame 40 rests upon the cross-frame members 20 and 22 of the frame 14 and is supported thereby. Mounted within the frame 40 is a floor construction 42 which forms the bottom of the trailer 10.

Extending upwardly from the frame 40 at each side thereof are longitudinally extending metal side panels 44 which terminate at their upper ends in longitudinally extending straps 46 of a U-shaped upper frame portion. The panels 44 are also braced at their forward ends by vertical supports 48 and at their rear ends by diagonal supports 50. The diagonal supports 50 are secured to outwardly extending portions of the rear cross frame member 22 and are connected to the panels 44 intermediate their heights. The metal side panels 44 are also reinforced by an interior wooden lining 52. While it has not been clearly illustrated, it will be understood that the body 16 also includes a front panel 54 which is of the same height as the side panels 44 and is of a similar construction.

Secured to the upper inner edge of the left hand side panel, as viewed in Figure 2, are a plurality of hinges 56 which hingedly connect to said side panel a first top panel, which is referred to in general by the reference numeral 58. The top panel 58 includes a generally rectangular frame 60 which, as viewed in Figure 2, is formed of a plurality of downwardly opened angle members. Secured to the lower surfaces of the uppermost flanges of the angle members forming the frame 60 is a metal panel 62. The metal panel 62 is further provided with a lining 64 which faces the interior of the body 16 when the same is in a closed state.

Secured to the strap at the upper edge of the right hand side panel, as viewed in Figure 2, is a plurality of spaced hinges 66 which hingedly connect a second top panel, which is referred to in general by the reference numeral 68, to the right hand side panel. The second top panel 68 also includes a rectangular frame 70 which is formed of downwardly facing angle members when viewed in Figure 2. Secured to the lower surfaces of the horizontal flanges of the angle members forming the frame 70 is a metal panel 72. The metal panel 72, like the metal panel 62, is provided with a wooden lining 74 on the lower or inner side thereof.

In order that the top panels 58 and 68 may be retained in closed position, the frame 70 of the top panel 68 is formed with a plurality of spaced snap fasteners 76 which have cooperating portions secured to the left side panel 44, as viewed in Figure 2.

The rear end of the body 16 is closed by an end gate which is referred to in general by the reference numeral 78. The end gate 78 includes a generally rectangular frame 80 formed of inwardly open angle members. Secured to the inner surfaces of vertical flanges of the angle members is a metal panel 82. If desired, the metal panel 82 may be provided with an interior lining formed of wood (not shown).

Secured to the exterior of the metal panel 82 is an elongated shaft 84 which passes through an opening in a vertical plate 86. The shaft 84 is provided with a head 88 which prevents removal of the same from engagement with the plate 86.

The plate 86 is connected by a plurality of vertical spaced hinges 90 to a rear end of the left side panel, as viewed in Figure 1, whereby the same may be pivoted about a vertical axis to move the end gate 78 in substantially rearwardly extending alignment with the left side panel. Inasmuch as the end gate 78 is pivotally connected to the vertical plate 86 by the shaft 84, it will be seen that the same may be pivoted about a horizontal axis to a position in a horizontal plane.

In order that the end gate 78 may be rigidly supported in a horizontal plane to form a table-like structure, the edge thereof remote from the vertical plate 86 is provided with a pair of U-shaped connecting elements 92 which pivotally connect supports, which are referred to in general by the reference numeral 94, thereto. The supports 94 are adjustable in length and are intended to engage the ground for supporting the end gate 78 in a horizontal plane. The structure of the supports 94 will be explained in more detail.

In order that the trailer 10 may be prepared to travel along the road and pass the inspection of many States, there is secured to the side panels 44 outwardly projecting fenders 96. Each of the fenders 96 overlies one of the wheels 32 and functions in the normal manner.

Secured to the rear of the rear cross frame member 22 is a plurality of lights 98, the lights 98 being such which may be required by low. Also secured to the rear surface of the rear cross frame member 22 is a conveniently located tag 100.

Referring now to Figures 3, 4 and 5 in particular, it will be seen that the camp trailer 10 is illustrated in open state ready for use. In order that the camp trailer may be maintained on an even keel, the rear cross frame member 22 has secured thereto by fittings 104 removable supports which are referred to in general by the reference numeral 106, the supports 106 being adjustable in height and positioned adjacent the ends of the cross frame member.

The first top panel 58 has been swung outwardly to lie in a horizontal plane and the outer portion thereof is supported by a pair of longitudinally spaced downwardly extending ground engaging supports, which are referred to in general by the reference numeral 108. The supports 108 are adjustable in length and are adapted to engage the ground for supporting the outer portion of the first top panel 58. The upper ends of the supports 108 are pivotally connected by U-shaped fittings 110 to the top panel 58 and are adapted to lie between the top panel 58 and the top panel 68 when the body is in its closed state, as is best illustrated in Figure 2.

Also folded to an outwardly extending position is the top panel 68. The top panel 68 is also provided with a pair of longitudinally spaced downwardly extending supports which are referred to in general by the reference numeral 112. The supports 112 are adapted to engage the ground for supporting the outer portion of the top panel 68 and are adjustable in length. The upper ends of the supports 112 are pivotally connected to the top panel 68 by U-shaped mounting brackets 114 which permit the folding of the supports 112 to an overlying position with respect to the top panel 68 when the body 16 is in a closed position, as is best illustrated in Figure 1. The supports 112 are retained in their folded positions by clamps 116 carried by the metal panels 72.

It will be noted that the top panels 58 and 68, which form sleeping platforms in their outwardly folded positions, have positioned thereon mattresses 118 and 120, respectively, in order to provide suitable sleeping surfaces.

It will be noted that the end gate 78 is illustrated in Figure 3 in its rearwardly projecting position to form a table-like structure. In order that the end gate 78 may be retained in a closed position, the top panel 68 is provided with a removable pin 122 which passes downwardly through the upper edge of the end gate 78, as is best illustrated in Figure 1.

Also extending rearwardly from the outer side of the body 16 is a second table-like structure which is referred to in general by the reference numeral 124. The table-like structure 124 includes a generally rectangular panel 126 of substantially the same size and the end gate 78 which is positioned in substantially the same horizontal plane as is the end gate 78. The panel 126 is provided at its forward edge with a pair of transversely spaced hangers 128 whose upper ends are adapted to be hooked over the frame 70 of the top panel 68. The panel 126 extends rearwardly and has projecting downwardly from the underside thereof adjacent the rear end a pair of transversely spaced supports which are referred to in general by the reference numeral 130. The supports 130 are adapted to engage the ground and support the rear end of the panel 126, the supports being adjustable in height. The supports 130 are pivotally connected to the underside of the panel 126 by U-shaped mounting members 132 whereas the hangers 128 are hingedly secured to the upper side thereof.

Overlying the various portions of the camp trailer 10 is a tent-like canopy which is referred to in general by the reference numeral 134. The canopy 134 includes longitudinally extending side supports 136 which are supported by angle members 138 extending upwardly from the outer corners of the top panels 58 and 68. The angle members 138 are braced by removable diagonal braces 140 which extend upwardly from the frames of the top panels. The longitudinal supports 136 are formed of telescoping tubular members which are adapted to project rearwardly of the main portion of the trailer body 16 and overlie the table-like structures formed by end gates 78 and panel 126.

Supported by the bottom 42 of the body 16 is a pair of longitudinally spaced center supports which are referred to in general by the reference numeral 142. The center supports 142 have removably connected to the upper ends thereof a longitudinally extending center support 144. The center support 144, like the longitudinal supports 136, is formed of a plurality of telescoping members which are adapted to extend rearwardly of the main portion of the body 16 to overlie the table-like structures at the rear thereof. It will be understood that the longitudinal supports 136 and the center support 144 are collapsible to a length whereby the same may be positioned within the body of the camp trailer when the same is in a collapsed state.

Secured to the outer edges of the frames 60 and 70 when the same are in outwardly folded positions, are outer ends of a flexible covering 146. The flexible covering 146 extends upwardly alongside the vertical angle members 138, over the longitudinal supports 136 and upwardly over the central support 144. The longitudinal supports 136 are disposed in sleeves 148 secured to the covering 146 whereas the central support 144 merely underlies the same. As is best illustrated in Figure 5, that portion of the flexible covering 146 which extends between the longitudinal supports 136 and the central support 144 projects rearwardly of the main portion of the body 16 and overlies the table-like structures.

Inasmuch as the adjustable supports disclosed herein are identical with the exception of their over-all length, only one of the adjustable supports 108 will be described in detail.

Referring now to Figures 4 and 6 in particular, it will be seen that the adjustable support 108 includes upper and lower tubular sections 150 and 152 which are connected together intermediate the ends of the adjustable support. The upper end of the upper tubular member 150 is pivotally connected to its mounting bracket and the lower end of the lower tubular member 152 has removably secured thereto a base 154 which is adapted to engage the ground.

As is best illustrated in Figure 6, the lower tubular member 152 has secured within its bore an upwardly extending threaded stud 156. The threaded stud has threadedly engaged thereon a nut 158 which is secured to the lower end of the upper tubular member 150. The nut 158 is secured in the upper end of a sleeve 160 which is telescoped over the upper end of the lower tubular member 152 and encloses the exposed portion of the threaded stud 156. The sleeve 160 is utilized for facilitating the rotation of the nut 158 to vary the effective length of the adjustable support 108.

Referring now to Figure 2 in particular, it will be seen that secured to the inner surface of the wooden linings 52 of the side panels is a pair of longitudinally extending transversely aligned downwardly open angle members 162. The angle members 162 are spaced vertically above the bottom 42 and are adapted to have overlying the same the panel 126 when the camp trailer is in its closed state. Mounted on the panel 126 and supported thereby are the mattresses 118 and 120 and the various elements of the tent-like canopy 134. It will be understood that the various supports which may be removed from the various parts of the camp trailer may also be supported above the panel 126.

The space below the panel 126 and above the bottom 42 is left open and may be utilized for removably carrying various necessary articles. These articles may include fishing equipment, clothing, food, etc.

Referring now to Figure 7 in particular it will be seen that there is illustrated a rear portion of a slightly modified form of body which is referred to in general by the reference numeral 164. The body 164 includes a bottom 166 and a right side panel 168. Hingedly secured to the rear end of the right side panel 168 is an end gate structure which is referred to in general by the reference numeral 170. The end gate structure 170 is a box-like device which is hollow and is partitioned by a plurality of shelves 172 and partitions 174. The inner side of the end gate 170 is provided with a hinged door 176 which may be supported in an opened horizontal position by flexible members 178 extending downwardly from the upper edge of the rear wall.

The rear right corner of the end gate structure 170 is hingedly connected to the rear corner of the right side panel 168 by strap hinges 180. Due to the thickness of the end gate structure 170, the inner wall thereof is of a less width than the outer rear wall thereof in order that the same may be conveniently swung inwardly of the body 164. It will be understood that the other portions of the body 164 are identical to the body 16 and that the end gate structure 170 is of a type which may be utilized in lieu of the end gate 78.

It is intended that the end gate 170 be stocked with provisions and other necessities which should be readily obtainable. When it is desired to utilize the necessities, the end gate 170 is swung outwardly to the position illustrated in Figure 7 and the door 176 lowered. The necessities stored within the end gate structure 170 are then readily attainable.

In view of the foregoing, it will be seen that the camp trailer, which is the subject of this invention, is of such a construction whereby the same provides the necessary comfort required by a camper and at the same time is a compact construction whereby the same may be folded into a compact unit. By so folding into a compact unit, the camp trailer may be easily and conveniently towed behind a suitable tow vehicle such as a passenger vehicle.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A camp trailer comprising a body having spaced side panels and an end gate extending between the rear ends of said side panels, a vertical member hingedly connected to one end of one of said side panels and adjacent said end gate for swinging movement about a vertical axis and a rod pivotally connecting said end gate to said plate for pivotal movement about a horizontal axis for movement into a horizontal plane to form a table-like structure, adjustable supporting legs pivotally connected to said end gate, said legs being operable to support the end gate in a horizontal plane.

2. A camp trailer comprising a body having spaced side panels and an end gate, a vertical member hingedly connected to one end of one of said side panels adjacent said end gate, one edge of said end gate being pivotally connected to said vertical member by a single horizontal shaft, said vertical member being pivotable about a vertical axis whereby said end gate may be pivoted to a horizontal position at one end of said body and extending longitudinally thereof.

References Cited in the file of this patent

UNITED STATES PATENTS

| | | |
|---|---|---|
| 773,776 | Barber | Nov. 1, 1904 |
| 1,185,981 | Campbell et al. | June 6, 1916 |
| 1,207,266 | Bartholomew | Dec. 5, 1916 |
| 1,276,388 | Marx | Aug. 20, 1918 |
| 1,300,021 | Richards | Apr. 8, 1919 |
| 1,435,251 | Moore | Nov. 14, 1922 |
| 1,477,111 | Eaton | Dec. 11, 1923 |
| 1,579,815 | Humphrey | Apr. 6, 1926 |
| 1,952,883 | Nelson | Mar. 27, 1934 |

FOREIGN PATENTS

| | | |
|---|---|---|
| 566,123 | Germany | Dec. 12, 1932 |
| 447,927 | Great Britain | May 28, 1936 |